United States Patent
Kim

(10) Patent No.: US 9,452,652 B2
(45) Date of Patent: Sep. 27, 2016

(54) DEVICE FOR ADJUSTING HEIGHT OF VEHICLE

(71) Applicant: HYUNDAI MOBIS CO., LTD., Seoul (KR)

(72) Inventor: Hansoo Kim, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/619,017

(22) Filed: Feb. 10, 2015

(65) Prior Publication Data
US 2015/0224846 A1    Aug. 13, 2015

(30) Foreign Application Priority Data

Feb. 11, 2014   (KR) ........................ 10-2014-0015505

(51) Int. Cl.
| | | |
|---|---|---|
| *B60G 17/015* | (2006.01) | |
| *F16H 25/20* | (2006.01) | |
| *B60G 17/033* | (2006.01) | |
| *B60G 17/052* | (2006.01) | |

(52) U.S. Cl.
CPC ......... *B60G 17/0157* (2013.01); *B60G 17/033* (2013.01); *B60G 17/0525* (2013.01); *B60G 17/0526* (2013.01); *F16H 25/2015* (2013.01); *B60G 2202/152* (2013.01); *B60G 2400/252* (2013.01); *B60G 2500/30* (2013.01); *B60G 2500/302* (2013.01); *F16H 2025/209* (2013.01); *F16H 2025/2046* (2013.01); *F16H 2025/2084* (2013.01)

(58) Field of Classification Search
CPC ........... B60G 17/0157; F16H 25/2015; F16H 2025/209; F16H 2025/2046; F16H 2025/2084
See application file for complete search history.

(56) References Cited

U.S. PATENT DOCUMENTS

| | | | | |
|---|---|---|---|---|
| 4,775,025 A | * | 10/1988 | Parker .................. | B62K 25/005 180/219 |
| 5,427,337 A | * | 6/1995 | Biggs ..................... | A61G 15/02 248/157 |
| 6,308,963 B1 | * | 10/2001 | Lee ..................... | B60G 17/0525 280/124.1 |
| 6,902,045 B2 | * | 6/2005 | Oliver .................. | B60G 15/063 188/321.11 |
| 2003/0205420 A1 | * | 11/2003 | Mulhern ................ | A61G 5/043 180/65.1 |
| 2006/0142916 A1 | * | 6/2006 | Onuma ................ | B60G 17/015 701/38 |
| 2007/0210539 A1 | * | 9/2007 | Hakui .................. | B60G 15/063 280/5.514 |
| 2008/0252025 A1 | * | 10/2008 | Plath ...................... | B60G 9/003 280/5.514 |
| 2009/0283977 A1 | * | 11/2009 | Michel ..................... | B60G 7/04 280/6.157 |
| 2010/0152969 A1 | * | 6/2010 | Li ..................... | B60G 17/0165 701/37 |

(Continued)

FOREIGN PATENT DOCUMENTS

| | | |
|---|---|---|
| DE | 10-2010-053334 A1 | 6/2012 |
| DE | 10-2011-090089 A1 | 7/2013 |
| KR | 10-2010-0127395 A | 12/2010 |

*Primary Examiner* — Darlene Condra

(57) ABSTRACT

The present invention relates to a device for adjusting a height of a vehicle, which is installed between an upper end portion of a suspension spring or the suspension spring, which is installed to support a load of a vehicle, and a suspension system supporting unit which is installed to support the suspension spring, and adjusts a height of the vehicle, the device including: a motor; a screw; a gear device which transmits rotational force of the motor to the screw; and a screw guide which is moved upward and downward by rotation of the screw, in which the height of the vehicle is adjusted in accordance with the up and down movement of the screw guide.

10 Claims, 4 Drawing Sheets

(56) References Cited

U.S. PATENT DOCUMENTS

| | | | |
|---|---|---|---|
| 2011/0067511 A1* | 3/2011 | Pettersson | F16H 25/2015 74/89.28 |
| 2011/0101632 A1* | 5/2011 | Mochizuki | B60G 17/027 280/6.157 |
| 2011/0221109 A1* | 9/2011 | Hinouchi | B60G 15/063 267/221 |
| 2012/0139395 A1* | 6/2012 | Dietrich | H02K 11/0015 310/68 B |
| 2014/0091552 A1* | 4/2014 | Tominaga | B62K 11/04 280/284 |

* cited by examiner

<PRIOR ART>

DEVICE FOR ADJUSTING HEIGHT OF VEHICLE

CROSS-REFERENCE TO RELATED APPLICATIONS

This application claims priority to and the benefit of Korean Patent Application No. 10-2014-0015505 filed in the Korean Intellectual Property Office on Feb. 11, 2014, the entire contents of which are incorporated herein by reference.

TECHNICAL FIELD

The present invention relates to a device for adjusting a height of a vehicle, and more particularly, to a device for adjusting a height of a vehicle, which adjusts a height of a vehicle using a motor and gears.

BACKGROUND ART

In general, in a suspension system, a suspension spring is provided together with a shock absorber in order to absorb various types of vibration or impact, which is transmitted from a road surface when a vehicle travels, and to improve ride quality. The suspension spring of the suspension system may be classified into a leaf spring, a coil suspension spring, an air suspension system, and the like, and the air suspension system is advantageous in that a height of the vehicle may be constantly maintained or adjusted, but because a device for adjusting an amount of air according to a load, a device for compressing air, and the like are additionally required, the air suspension system is restrictively and mainly used for a large-scale vehicle such as a bus, or a high-grade passenger vehicle.

In particular, the high-grade vehicle uses a system for adjusting a height of a vehicle body for the purpose of ride quality, driving stability, and improvement in fuel efficiency. As representative methods, there are an air suspension system in which an air suspension spring is mounted instead of the existing coil suspension spring so as to adjust a height of the vehicle body by air flowing into and out of the air suspension spring, and an active body control (ABC) system of Benz which adjusts a height of a surface, on which the coil suspension spring is mounted, using hydraulic pressure.

As a technology in the related art relevant to the air suspension system, Korean Patent Application Laid-Open No. 10-2010-0127395 (Dec. 6, 2010) discloses "Hybrid Air Suspension System for Easily Adjusting Height of Vehicle".

The hybrid air suspension system for easily adjusting a height of a vehicle is characterized in that the hybrid air suspension system connects a vehicle body and a wheel, and uses inflow and outflow of air so as to absorb a shock of the vehicle body and adjust a height of a vehicle.

The ABC system requires very high costs and has a complicated system configuration because a dedicated hydraulic actuator, piping for hydraulic pressure, and the like need to be considered.

The air suspension system may be more environmentally friendly than using hydraulic pressure and may be configured with a relatively simple structure because the air suspension system uses air, but pneumatic lines need to be connected at each corner in order to control pneumatic pressure, and an air compressor is indispensably required in order to control a solenoid pneumatic valve of a separate air suspension spring and produce high-pressure air.

Accordingly, because costs of the air suspension system are also higher than other systems in the vehicle, the air suspension system has been mainly used merely in a high-grade vehicle up to now.

SUMMARY OF THE INVENTION

The present invention has been made in an effort to provide a device for adjusting a height of a vehicle, which adjusts a height of a vehicle using a motor and gears.

An exemplary embodiment of the present invention provides a device for adjusting a height of a vehicle, which is installed between an upper end portion of a suspension spring or the suspension spring, which is installed to support a load of a vehicle, and a suspension system supporting unit which is installed to support the suspension spring, and adjusts a height of the vehicle, the device including: a motor; a screw; a gear device which transmits rotational force of the motor to the screw; and a screw guide which is moved upward and downward by rotation of the screw, in which the height of the vehicle is adjusted in accordance with the up and down movement of the screw guide.

The gear device may include: a worm gear which is installed on a shaft of the motor; and a spur gear which is installed between the worm gear and the screw, and transmits rotational force of the worm gear to the screw.

The device may further include a limit sensor which allows an operation of the motor to be stopped when the screw guide reaches a predetermined height.

The device may further include an encoder which is installed on the motor.

The device may further include a vehicle height sensor which senses a height of the vehicle, in which an operation of the motor is controlled in accordance with a signal transmitted from the vehicle height sensor.

The suspension system supporting unit may be a front suspension system supporting unit which is positioned at a front side of the vehicle.

The suspension system supporting unit may be a rear suspension system supporting unit which is positioned at a rear side of the vehicle.

The device for adjusting a height of a vehicle according to the exemplary embodiment of the present invention, which has the aforementioned configuration, uses the motor and the gears, and as a result, a structure of the device is simple, thereby reducing costs.

That is, unlike an air suspension system or a hydraulic suspension system, separate devices such as a pneumatic line and a compressor or a hydraulic line and a hydraulic actuator are not required. Accordingly, since the number of components is reduced, it is possible to simplify a process and reduce weight and costs.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
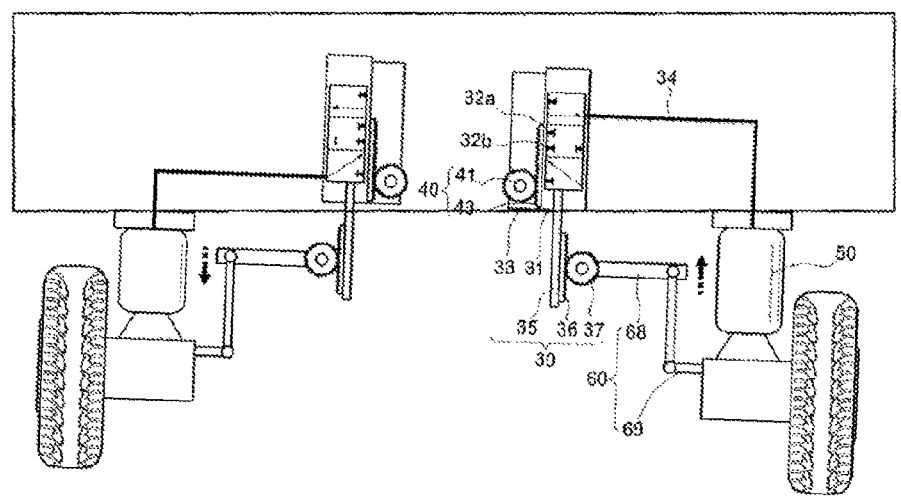
FIG. 1 is a view illustrating a hybrid air suspension system for easily adjusting a height of a vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings in order to clarify a method of solving the technical problems of the present invention. However, in the description of the present invention, descriptions of publicly-known related technologies incorporated herein will be omitted when it is determined that the descriptions of the publicly-known related technologies may obscure the subject matter of the present invention. The terms used in the following description are defined considering the functions of the present invention and may vary depending on the intention or usual practice of a designer or manufacturer. Therefore, the definitions should be made based on the entire contents of the present specification. Parts indicated by like reference numerals (reference numbers) refer to like elements throughout the specification.

Hereinafter, a device for adjusting a height of a vehicle according to an exemplary embodiment of the present invention will be described.

Figure 2:
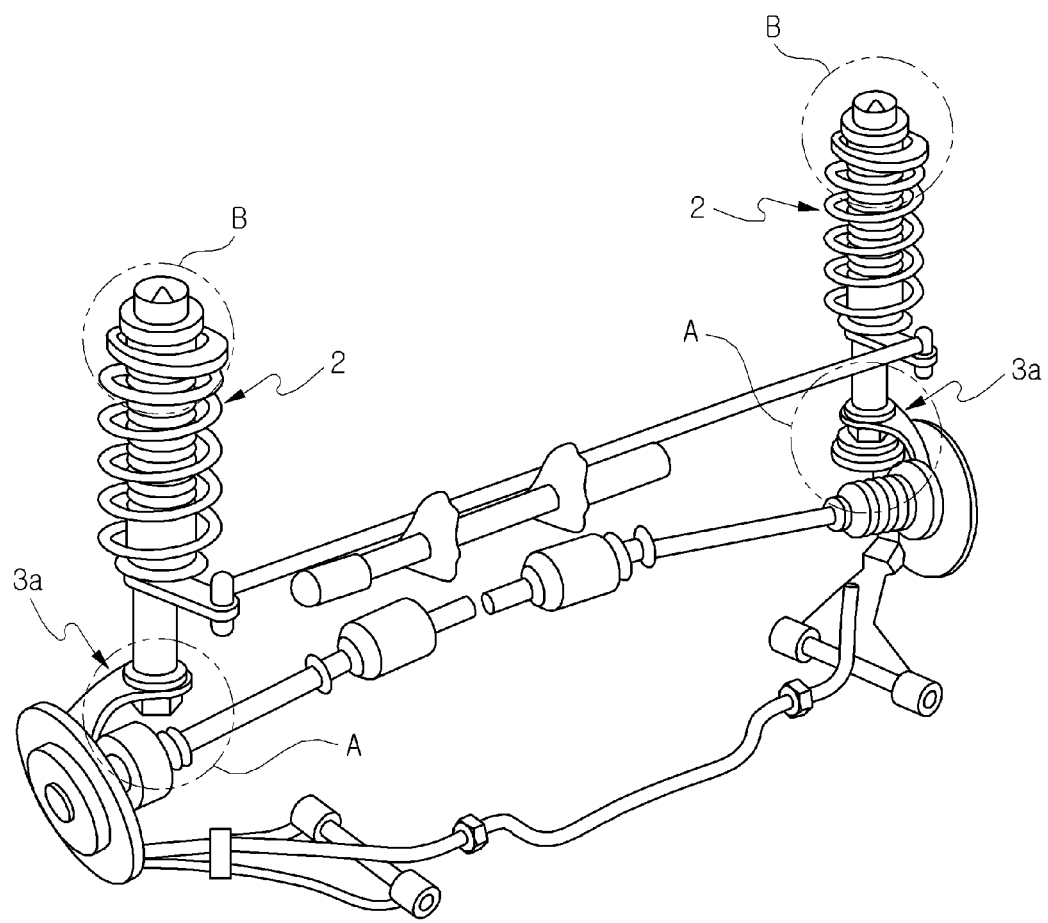
FIGS. 2 and 3 are views illustrating a position at which a device for adjusting a height of a vehicle according to the exemplary embodiment of the present invention is installed.
Figure 3:
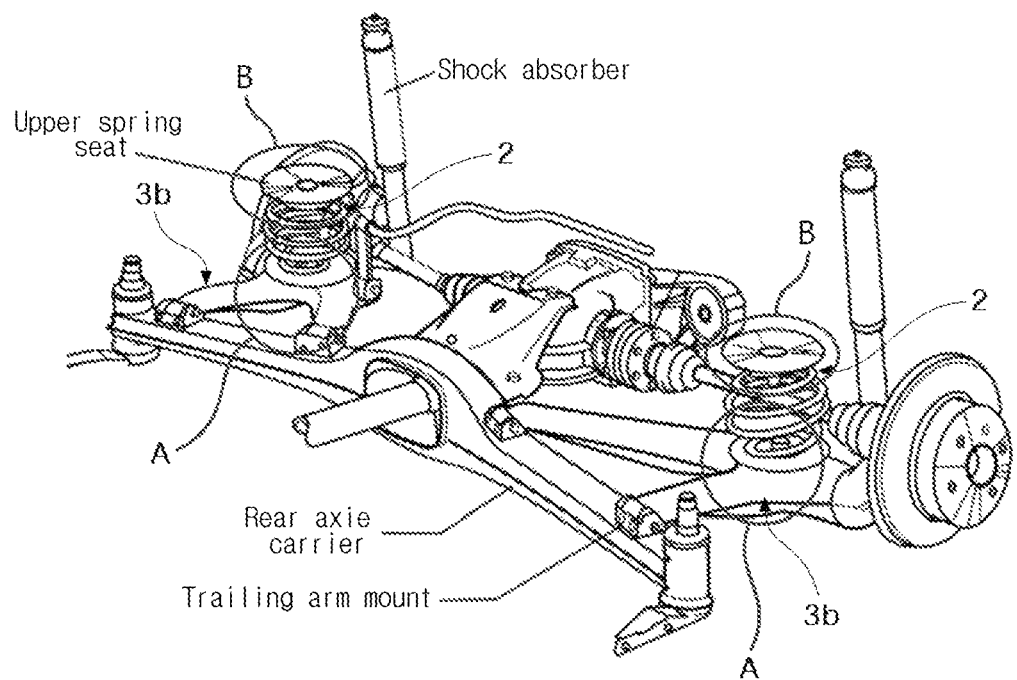
Figure 4:
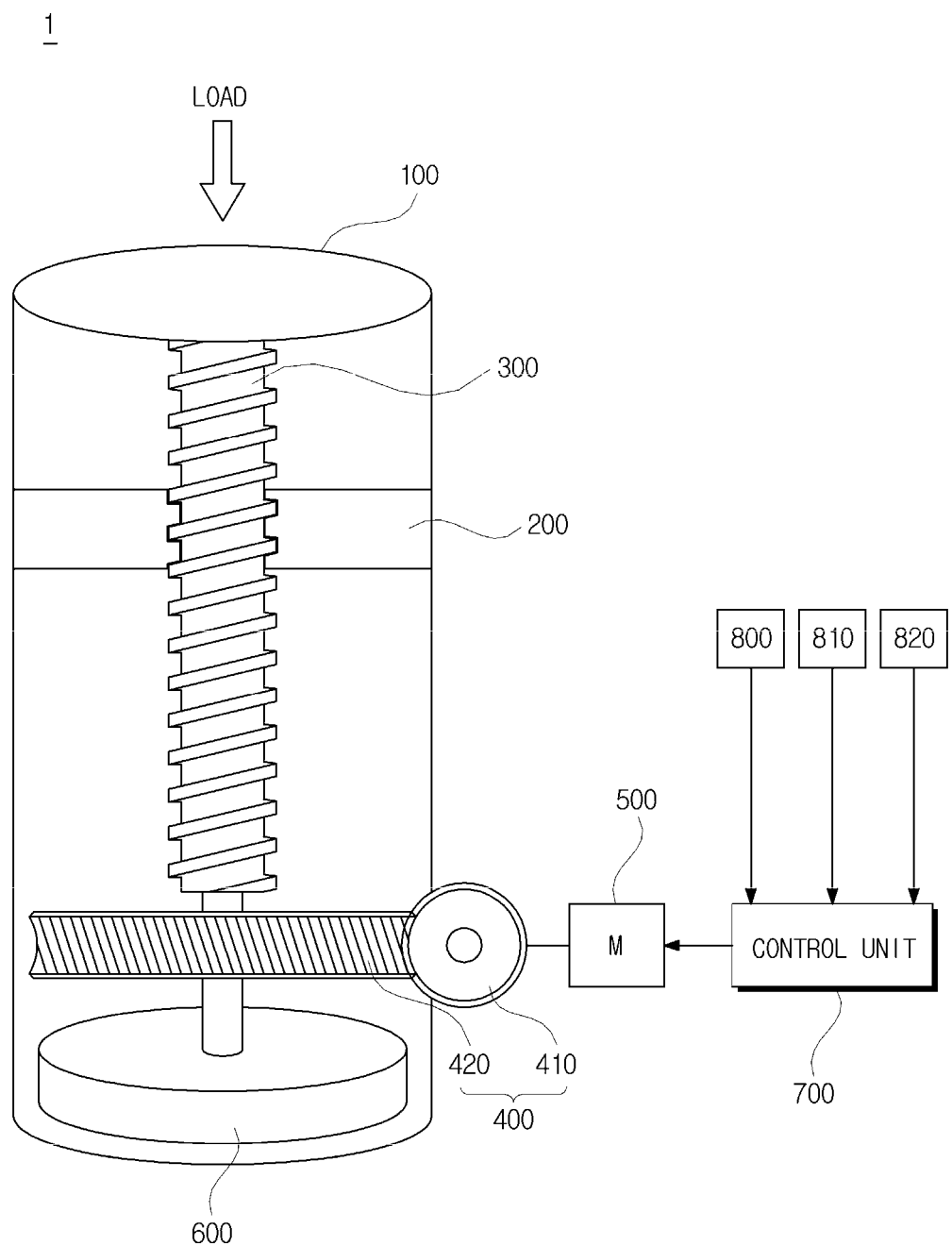
FIG. 4 is a view illustrating the device for adjusting a height of a vehicle according to the exemplary embodiment of the present invention which is installed in Region A or B in FIGS. 2 and 3.

Referring to FIGS. 2 to 4, a device 1 for adjusting a height of a vehicle according to an exemplary embodiment of the present invention is installed between an upper end portion of a suspension spring 2 or the suspension spring 2, which is installed to support a load of a vehicle (not illustrated), and suspension system supporting units 3a and 3b which are installed to support the suspension spring 2, and the device 1 adjusts a height of the vehicle. In particular, the device 1 may adjust the height of the vehicle by adjusting the height of the vehicle only at a point of time when it is necessary to control the height of the vehicle, for example, a problem with the suspension spring 2 occurs.

The device 1 for adjusting a height of a vehicle may be installed in Region A or B, as illustrated in FIGS. 2 and 3. That is, the device 1 for adjusting a height of a vehicle may be installed at each of the four wheels. Accordingly, the height of the vehicle may be adjusted at each of the wheels of the vehicle.

The device 1 for adjusting a height of a vehicle is installed only at a front suspension system supporting unit 3a or only at a rear suspension system supporting unit 3b, thereby adjusting only the height of the vehicle at the front side of the vehicle, or adjusting only the height of the vehicle at the rear side of the vehicle.

Referring to FIG. 4, the device 1 for adjusting a height of a vehicle may include a housing 100, a screw guide 200, a screw 300, a gear device 400, a motor 500, and a lower supporting unit 600.

The housing 100 may be installed at a lower end portion of the suspension spring 2 so as to support a load that is applied through the suspension spring 2, or may be installed at an upper end portion of the suspension spring so that a load of the vehicle may be applied to the suspension spring 2.

As illustrated in FIG. 4, the housing 100 may be formed to have an accommodating space therein, and have one open side. The screw guide 200, the screw 300, and the gear device 400 may be installed in the accommodating space. An example in which the motor 500 is installed outside the housing 100 is presented, but the present invention is not necessarily limited thereto, and the motor 500 may of course be installed inside the housing 100.

The screw guide 200 is installed in the accommodating space in the housing 100, and moved upward and downward by rotation of the screw 300. Accordingly, the housing 100 is moved upward and downward by the screw guide 200, such that the suspension spring 2 is moved upward and downward, thereby adjusting the height of the vehicle.

The gear device 400 transmits rotational force of the motor 500 to the screw 300 when the motor 500 is rotated. Accordingly, as the screw 300 is rotated, the screw guide 200 is moved upward and downward.

Here, as illustrated in FIG. 4, the gear device 400 may include a worm gear 410, and a spur gear 420.

The worm gear 410 is installed at one side of the motor 500. The spur gear 420 is installed between the worm gear 410 and the screw 300, and transmits rotational force of the worm gear 410 to the screw 300.

Since the worm gear 410 and the spur gear 420 are used, the spur gear 420 is operated through the worm gear 410 when the height of the vehicle needs to be controlled. However, even though the spur gear 420 is about to be rotated by a change of the height of the vehicle while the vehicle travels, the worm gear 410 may prevent the spur gear 420 from being rotated.

That is, the motor 500 does not need to be separately driven in a state in which a control operation is not performed, and the motor 500 may be operated only in a case in which it is necessary to control the motor 500 in order to adjust the height of the vehicle. Therefore, the necessity for controlling a static position of the motor 500 is eliminated, such that electric power consumption of the motor 500 may be reduced.

In the exemplary embodiment of the present invention, an example in which the device 1 for adjusting a height of a vehicle uses the spur gear 420 is presented, but the present invention is not necessarily limited thereto, and a helical gear or the like may also be used to transmit rotational force of the motor 500 to the screw 300. However, in a case in which the helical gear is used, an operation of controlling a position of the motor may be additionally required.

As illustrated in FIG. 4, the lower supporting unit 600 supports a shaft shared by the screw 300 and the spur gear 420.

In a case in which the device 1 for adjusting a height of a vehicle is installed in Region A, suspension system supporting frames 3a and 3b are installed at lower sides of the lower supporting units 600. In a case in which the device 1 is installed in Region B, an upper end portion of the suspension spring 2 is installed at a lower side of the lower supporting unit 600.

Therefore, a load of the vehicle, which is transmitted to the suspension spring 2, is supported by the suspension spring 2 or the suspension system supporting units 3a and 3b through the device 1 for adjusting a height of a vehicle.

Meanwhile, the device 1 for adjusting a height of a vehicle may include a control unit 700, and a vehicle height sensor 800. The device 1 may include a limit sensor 810 or an encoder 820 instead of the vehicle height sensor 800.

The vehicle height sensor 800 senses the height of the vehicle. Accordingly, the vehicle height sensor 800 transmits a signal including information about the height of the vehicle to the control unit 700. The control unit 700 operates the motor 500 in accordance with the signal from the vehicle height sensor 800, thereby adjusting the height of the vehicle.

Here, the vehicle height sensor 800 may be installed at each of the wheels of the vehicle. Otherwise, the vehicle height sensor 800 may be installed may be installed only at either a front wheel or a rear wheel.

The encoder 820 may be installed on the motor 500, and may be substituted for the vehicle height sensor 800.

The limit sensor 810 may be substituted for the vehicle height sensor 800.

The limit sensor 810 senses whether the screw guide 200 reaches a predetermined height. Accordingly, when the screw guide 200 reaches the predetermined height, the limit sensor 810 allows an operation of the motor 500 to be stopped.

In a case in which the screw guide 200 does not reach the predetermined height, the limit sensor 810 may transmit a signal to the control unit 700 so that the screw guide 200 reaches the predetermined height. The control unit 700 may control the motor 500 so as to allow the screw guide 200 to reach the predetermined height.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A device for adjusting a height of a vehicle, which is disposed between a suspension spring and a suspension system supporting unit, the suspension system supporting unit coupled to a wheel and supporting the suspension spring, a shock absorber being disposed apart from the suspension spring, the device comprising:
    a motor;
    a gear device transmitting a rotational force of the motor, the gear device including:
        a worm gear coupled to a shaft of the motor; and
        a spur gear disposed between the worm gear and a screw, the spur gear transmitting a rotational force of the worm gear to the screw, the screw being coupled to the gear device;
    a screw guide moving along an axis of the screw when the screw rotates about the axis;
    a housing encompassing the screw guide, the screw, and the spur gear; and
    a lower supporting unit disposed in a lower portion of the housing and coupled to the spur gear and the screw by a shaft,
    wherein the height of the vehicle varies with the movement of the screw guide.

2. The device of claim 1, further comprising:
    a limit sensor which stops an operation of the motor when the screw guide reaches a predetermined height.

3. The device of claim 1, further comprising:
    an encoder which is installed on the motor.

4. The device of claim 1, further comprising:
    a vehicle height sensor which senses the height of the vehicle,
    wherein an operation of the motor is performed according to a signal transmitted from the vehicle height sensor.

5. The device of claim 1, wherein the suspension system supporting unit is a rear suspension system supporting unit which is positioned at a rear side of the vehicle.

6. The device of claim 1, wherein the housing is attached to the screw guide such that the housing moves along the axis of the screw when the screw guide moves along the axis.

7. The device of claim 1, wherein the shock absorber is coupled to the suspension system supporting unit.

8. A device, which is disposed over a suspension spring, for adjusting a height of a vehicle, a shock absorber being disposed apart from the suspension spring, the device comprising:
    a motor;
    a gear device transmitting a rotational force of the motor, the gear device including:
        a worm gear coupled to a shaft of the motor; and
        a spur gear disposed between the worm gear and a screw, the spur gear transmitting a rotational force of the worm gear to the screw, the screw being coupled to the gear device;
    a screw guide moving along an axis of the screw when the screw rotates about the axis;
    a housing encompassing the screw guide, the screw, and the spur gear; and
    a lower supporting unit disposed in a lower portion of the housing and coupled to the spur gear and the screw by a shaft,
    wherein the height of the vehicle varies with the movement of the screw guide.

9. The device of claim 8, wherein the housing is attached to the screw guide such that the housing moves along the axis of the screw when the screw guide moves along the axis.

10. The device of claim 8, wherein the shock absorber is coupled to a suspension system supporting unit.

* * * * *